United States Patent [19]

Horlbeck et al.

[11] 4,387,213
[45] * Jun. 7, 1983

[54] PROCESS FOR THE CONDENSATION OF LINEAR POLYALKYLENE TEREPHTHALATES

[75] Inventors: Gernot Horlbeck; Horst Heuer, both of Haltern; Hanns-Jörg Bax; Hans Jadamus, both of Marl, all of Fed. Rep. of Germany

[73] Assignee: Chemische Werke Huels AG, Marl, Fed. Rep. of Germany

[*] Notice: The portion of the term of this patent subsequent to Nov. 23, 1999, has been disclaimed.

[21] Appl. No.: 219,133

[22] Filed: Dec. 22, 1980

[30] Foreign Application Priority Data

Dec. 21, 1979 [DE] Fed. Rep. of Germany ........ 2951609

[51] Int. Cl.$^3$ ............................................. C08G 63/26
[52] U.S. Cl. ................................. 525/437; 528/274; 528/480; 528/483; 528/490; 528/308.5; 528/272
[58] Field of Search ............... 260/2, 3; 528/272, 274, 528/309, 480, 483, 490

[56] References Cited

U.S. PATENT DOCUMENTS

| T873,013 | 4/1970 | Kibler | 528/272 |
| 3,222,299 | 12/1965 | MacDowell | 260/2.3 |
| 3,344,091 | 9/1967 | Russin et al. | 260/2.3 |
| 3,405,098 | 10/1968 | Heighton et al. | 528/309 |
| 3,453,240 | 7/1969 | Plaster et al. | 525/437 |
| 3,585,259 | 6/1971 | Lefferts et al. | 528/483 |
| 3,634,356 | 1/1972 | Tryon | 528/483 |
| 3,953,404 | 2/1974 | Borman et al. | 525/437 |
| 4,078,143 | 3/1978 | Malik et al. | 260/2.3 |
| 4,165,420 | 8/1979 | Rinehart | 528/272 |
| 4,238,593 | 12/1980 | Duh | 528/480 |
| 4,271,287 | 6/1981 | Shah | 528/309 |

FOREIGN PATENT DOCUMENTS

| 2117748 | 10/1971 | Fed. Rep. of Germany . |
| 2162618 | 7/1972 | Fed. Rep. of Germany . |
| 905562 | 9/1962 | United Kingdom . |
| 1066162 | 4/1967 | United Kingdom . |
| 1251093 | 10/1971 | United Kingdom . |

*Primary Examiner*—Ronald W. Griffin
*Attorney, Agent, or Firm*—Millen & White

[57] ABSTRACT

A process for condensing a linear polyalkylene terephthalate having a viscosity number of at least 60 cc/g in two stages, at an elevated temperature, in the solid phase, and in the presence of an alkanediol, comprises, in a first stage, treating the polyalkylene terephthalate in an inert gas stream at a reaction temperature 30°-80° C. below its melting point, with 0.2-3.5% by weight, based on the weight of the polyalkylene terephthalate, of an alkanediol whose boiling point under normal pressure is 20°-70° C. above the reaction temperature, wherein the amount of inert gas passed through per hour, measured under standard conditions, corresponds to 0.3 to 2 times the gross reactor volume; and, in a second stage, condensing the polyalkylene terephthalate in an inert gas stream at a temperature 5°-25° C. below its melting point, wherein the amount of inert gas passed through per hour, measured under standard conditions, corresponds to 2.5 to 10 times the gross reactor volume.

11 Claims, No Drawings

| 4,387,213 |

PROCESS FOR THE CONDENSATION OF LINEAR POLYALKYLENE TEREPHTHALATES

CROSS-REFERENCE TO RELATED APPLICATIONS

This application is related to copending, commonly assigned application Ser. No. 219,041 filed Dec. 22, 1980, now U.S. Pat. No. 4,360,661, issued Nov. 23, 1982, which has a common inventive entity. The disclosure of the latter is incorporated by reference herein.

BACKGROUND OF THE INVENTION

The present invention relates to a process for condensing linear polyalkylene terephthalates having a viscosity number of at least 60 cc/g, in two stages, at an elevated temperature, in the solid phase, and in the presence of alkanediols.

Polyalkylene terephthalates, especially polyethylene terephthalate (PETP) and polybutylene terephthalate (PBTP) are excellent materials for the production of films, sheets, molded parts, etc. Especially for the manufacture of molded parts by injection molding and extrusion processes, polyalkylene terephthalate must exhibit a viscosity number of >100 cc/g.

Polyalkylene terephthalates are customarily produced by interesterification or esterification and subsequent polycondensation of terephthalic acid or its polyester-forming derivatives and an alkanediol, in the presence of catalysts (Sorensen and Campbell, Preparative Methods of Polymer Chemistry, Interscience Publishers Inc., NY [1961] : 111–127; "Kunststoff-Handbuch" [Plastics Manual] VIII, C. Hanser Publishers, Munich [1973], whose disclosures are incorporated by reference herein).

Using these processes, carried out in the melt, viscosities of a level required, for example, for injection molding and extrusion purposes, cannot be attained. Due to the temperature load, degradation reactions occur as early as the polycondensation stage, so that the desired high viscosity cannot be achieved.

A further limitation on the viscosity of the polyesters in the melt condensation method is due to the viscosity of the melt which increases with progressing polycondensation. This makes it difficult for the volatile, low-molecular weight reaction products to escape, or even makes such escape impossible, thereby inhibiting the progression of polycondensation. Additionally, technical difficulties are encountered in discharging the highly viscous melt from the reaction vessel (DOS [German Unexamined Laid-Open Application] No. 2,117,748).

Insofar as necessary, a solid-phase recondensation can be conducted (See, e.g., British Pat. No. 1,006,162 and U.S. Pat. No. 3,405,098, whose disclosures are incorporated by reference herein). This is done by bringing the polyester, in granulated or powdered form to a temperature lying approximately 10°–60° C. below the melting point. In this temperature range, the polyalkylene terephthalate is treated in an inert gas stream or under vacuum until the desired high viscosity has been attained. The recondensation can be conducted either discontinuously, for example in a tumbling dryer (DOS No. 2,117,748), or continuously, e.g. by the fluidizing method (DOS No. 1,804,551) or in a screw-type reactor (DOS No. 2,162,618).

A basic disadvantage of the solid phase recondensation resides in the long reaction times at elevated temperature; as a result, although a polyalkylene terephthalate is obtained having the desired viscosity, the product is already so damaged that it is strongly degraded upon processing from the melt. Molded parts made of such a material are brittle and fragile. It has therefore been suggested to use polyalkylene terephthalates in the ground form to shorten the recondensation time: but this method is not economical. In addition, there is the danger of caking of the powder (DOS's Nos. 2,152,245 and 2,117,748).

Another process includes reaction of the polyester, after the recondensation, with monofunctional glycidyl ethers or carbonates, thus improving the stability of the polyester (DOS No. 1,929,149). This process is time-consuming and requires the use of foreign-polyester substances.

DOS No. 2,503,000 proposes a method for the solid phase recondensation of PBTP wherein the recondensation is carried out in an inert gas stream constantly loaded with 1,4-butanediol. However, using this method it is impossible to attain the desired, high viscosity without the concomitant use of branching components. Polyalkylene terephthalates modified with branching components, as indicated in DOS No. 2,503,000, tend to gel and produce brittle and fragile molded parts.

SUMMARY OF THE INVENTION

Accordingly, it is an object of the present invention to develop a process for the preparation of highly viscous polyalkylene terephthalate which is stable in the melt, which process does not exhibit the disadvantages of prior art counterparts.

Upon further study of the specification and appended claims, further objects and advantages of this invention will become apparent to those skilled in the art.

These objects have been attained by providing a process comprising treating the polyalkylene terephthalate in a first stage, at temperatures 30°–80° C. below the melting point of the polyalkylene terephthalate, with 0.2–3.5% by weight, based on the amount of polyalkylene terephthalate, of an alkanediol, the boiling point of which under normal pressure is 20°–70° C. above the reaction temperature, in an inert gas stream, wherein the amount of inert gas passed through per hour, measured under standard conditions (0° C. and 1013 mbar), corresponds to 0.3 to 2 times the gross reactor volume; and, in a second stage, condensing the resultant polyalkylene terephthalate at temperatures 5°–25° C. below the melting point of the starting material polyalkylene terephthalate, in an inert gas stream, wherein the amount of inert gas passed through per hour, measured under normal conditions, corresponds to 2.5 to 10 times the gross reactor volume.

DETAILED DISCUSSION

Suitable alkanediols for use in this invention in the first stage include those of 2–6 carbon atoms in the carbon chain, for example, ethylene glycol, 1,4-butanediol, 1,6-hexanediol, neopentyl glycol, 1,3-butanediol, or similar compounds. Preferably, those diols are utilized which have been employed as the diol component of the polyalkylene terephthalate. In any event, care must be taken that the temperature difference specified by this invention between the boiling point of the diol and the reaction temperature is maintained. Preferred are diols, the boiling points of which range 30°–60° C. above the reaction temperature. The diols are preferably used in an amount of 0.3 to 1% by weight, based on the amount of polyalkylene terephthalate.

The reaction temperature of the first stage is preferably 35° to 60° C. below the melting point of the polyalkylene terephthalate. In the second stage, the preferred reaction temperature is 10°–20° C. below the melting point of the polyalkylene terephthalate. The reaction is customarily conducted in both stages under normal pressure; insofar as necessary, it is also possible to operate under vacuum, especially in the second stage.

The inert gas suitable for the first and second stages especially includes nitrogen which is customarily employed for polycondensation reactions. Other inert gases, however, can also be used. In the first stage, an amount of inert gas is passed through per hour which corresponds preferably to 0.5 to 1.5 times the gross reactor volume, measured under normal conditions. In the second stage, an amount of inert gas is preferred which corresponds, per hour, to 3 to 7 times the gross reactor volume. The volume data for the amounts of inert gas passed through the reactor do not refer to the respective reaction conditions but to standard conditions, i.e. 0° C. and 1013 mbar.

The process of this invention is controlled in the first stage so that the carboxy end group concentration decreases. Once the concentration reaches a minimum, or approximately a minimum, the first stage reaction is terminated and the polyalkylene terephthalate is treated further in accordance with the second stage. In terminating the first stage, it must be considered that the viscosity number of the polyester should not fall below 45–50 cc/g.

A suitable end point of the first stage of the process of this invention based upon the carboxy end group concentration can be determined by routine, preliminary experiments on small batches of the reaction mixture or based upon predictions which, in turn, are based upon standard routine experiments performed with other relted reaction blends.

The residence time of the polyalkylene terephthalate in the first reaction stage is generally, in dependence on the aforementioned parameters, about 2–16, preferably 3–10 hours; in the second reaction stage the residence time is approximately 4–30, preferably 8–25 hours.

The polyalkylene terephthalates suitable for the recondensation of this invention, preferably polyethylene terephthalate and polybutylene terephthalate, are produced according to the customary melt polycondensation processes. (See, e.g., J. G. Smith, Ch. J. Kibler and B. J. Sublett, Preparation and Properties of Poly(methylene terephthalates), J. Polymer Sci. A-1, 4, 1851–59 (1966), whose disclosures are incorporated by reference herein.) They should have a viscosity number of at least 60 cc/g, preferably at least 70 cc/g.

Up to 30 molar percent of the terephthalic acid in the polyalkylene terephthalates can be substituted by other conventional dicarboxylic acids. Examples of such suitable dicarboxylic acids include isophthalic acid, phthalic acid, 1,4-cyclohexane-dicarboxylic acid, adipic acid, sebacic acid, and decanedicarboxylic acid.

The diol component of the polyterephthalate is supplied by alkanediols of 2–12 carbon atoms in the carbon chain; preferred are ethylene glycol and 1,4-butanediol. Up to 30 mole % of the diol component of the respective polyalkylene terephthalate can be replaced by other diols, e.g. neopentyl glycol, 1,5-pentanediol, 1,6-hexanediol, 1,4- and 1,3-dimethylolcyclohexane, or 1,12-dodecanediol.

The term polyalkylene terephthalate as used in this invention also encompasses block copolyesters. Such products are described, for example, in Chimia 28 (9) : 544–552 (1974) and in Rubber Chemistry and Technology 50 : 688–703 (1977), whose disclosures are incorporated by reference herein. These block copolyesters contain, in addition to the above-mentioned aromatic dicarboxylic acids and diols, a polyoxyalkylenediol having a molecular weight in the range from about 600 to 2500. Preferred polyoxyalkylenediols are polyoxyethylenediol, polyoxypropylenediol, and polyoxytetramethylenediol. The proportion of polyoxyalkylenediols is in the range from 4 to 40% by weight, preferably 10–35% by weight based on the weight of the mentioned block copolyester.

The linear polyalkylene terephthalates utilized in the process of this invention can contain auxiliary agents and additives. Suitable for such purposes are, for example, nucleating agents, flatting agents, flowing agents, or other processing agents, as well as pigments, fillers, and reinforcing substances, or similar materials.

Nucleating agents, flatting agents, flowing agents, or other processing aids are contained in the polyalkylene terephthalate in amounts of up to 6% by weight, preferably 0.2–3.5% by weight, based on the weight of the total mixture.

Pigments, fillers, and reinforcing agents or similar compounds are contained in the polyalkylene terephthalate in amounts of up to 60% by weight, preferably 1–50% by weight, again based on the weight of the total mixture.

The auxiliary agents and additives can be present in the polyalkylene terephthalate at the beginning of the first stage of the condensation reaction of the invention, or can also be incorporated at any later time.

The polyalkylene terephthalates produced in accordance with this invention have improved hydrolysis and melt stability. Thus, they are suitable, for example, for the manufacture of monofilaments for filter fabrics which must meet high requirements regarding such properties. In general, the viscosity numbers of the final products are 120–230 cc/g, and the carboxy end group concentrations are 5–25 eq/$10^6$ g.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The parameters set forth in the specification and in the examples are determined using the following measuring techniques;

The melting point [$T_m$] is the melt maximum of the polyester determined by differential scanning calorimetry (DSC) (heating rate: 16° C/min).

The viscosity numbers (J) were measured in solutions of 0.23 g of polyalkylene terephthalate in 100 ml of phenol/1,1,2,2-tetrachloroethane (weight ratio 60:40) at 25° C.

The carboxy end group concentrations [COOH] were determined according to the method of H.A. Pohl (Analyt. Chem. 26:1614–1954).

The hydrolysis stability of the polyesters was characterized by measuring the viscosity number after a 24-hour treatment of the finely ground material with water having a temperature of 130° C. in a pressure vessel.

The degradation refers to the hydrolysis stability of the polyesters; it is indicated as the percentage reduction of the viscosity number caused by the hydrolysis:

$$\frac{J_o - J_{Hydr.}}{J_o} \cdot 100$$

($J_o$=initial viscosity number; $J_{Hydr.}$=viscosity number after hydrolysis test).

To determine the melt stability, the melt viscosities of the respective samples were measured at 240° C. in the mechanical spectrometer of Rheometrics (Cone-Plate System, diameter=25 mm, conical angle $\beta=0.1$ rad, frequency=1 rad/sec) for a time period of one hour and at 5-minute intervals.

The indicated amounts of nitrogen were measured under normal (standard) conditions.

Examples denoted by letters are not in accordance with the invention.

EXAMPLES 1-3

120 kg of polybutylene terephthalate ([J]: 77 cc/g; [COOH]: 17 eq/$10^6$ g; [$T_m$]: 225° C.) is combined in a 0.5 m³ tumbler dryer with the amount of 1,4-butanediol indicated in Table 1, heated to 180° C. in a nitrogen stream (for flow rate, see Table 1), and treated for 3-5 hours at this temperature. The nitrogen flow rate is then increased to 2 m³/h and the internal temperature of the tumbler dryer is raised to 210° C. Under these conditions, condensation is conducted for 24 hours.

EXAMPLE A 120 kg of the polybutylene terephthalate used in Examples 1-3 is condensed, without adding 1,4-butanediol, in a 0.5 m³ tumbler dryer at 210° C. and at 2 m³/h of N₂ for 24 hours.

The hydrolysis stability and melt stability of the products from Examples 1-3 and A are compiled in Table 2.

EXAMPLE 4

In a 0.5 m³ tumbler dryer, 58 kg of block copolyester ([J]: 83 cc/g; [COOH]: 39 eq/$10^6$ g; [$T_m$]: 220° C.), made up of 61% by weight of terephthalic acid, 29% by weight of 1,4-butane-diol, and 10% by weight of polyoxyethylenediol with $\overline{M}_n=1000$, is combined with 0.58 kg of 1,4-butanediol, heated in a nitrogen stream (0.5 m³/h) to 180° C., and left at this temperature for 10 hours. The internal temperature is then raised to 200° C. the nitrogen flow rate is increased to 2 m³/h, and the pressure is set at 40 mbar. After 24 hours, the viscosity number [J] is 168 cc/g. The carboxy end group concentration [COOH] is 21 eq/$10^6$ g.

EXAMPLE 5

In a 0.5 m³ tumbler dryer, 150 kg of block copolyester ([J]: 93 cc/g; [COOH]: 36 eq/$10^6$ g; [$T_m$]: 215° C.), made up of 57% by weight of terephthalic acid, 30% by weight of 1,4-butanediol, and 13% by weight of polyoxytetramethylenediol with $\overline{M}_n=1000$, is combined with 1.5 kg of 1,4-butanediol.

TABLE 1

| | Process Features in the First Stage | | |
|---|---|---|---|
| Example | 1,4-Butanediol Addition [% by Weight] | N₂ Flow Rate [m³/h] | Treatment Period [h] |
| 1 | 0.5 | 0.5 | 5 |
| 2 | 0.5 | 0.5 | 3 |
| 3 | 0.35 | 0.5 | 3 |

TABLE 2

| | Properties of the Specimens Treated According to Invention | | | | |
|---|---|---|---|---|---|
| Example | J [cc/g] | Hydrolysis Stability* [cc/g] | Degradation [%] | Melt Viscosity [Pa · s] After 10 min/ 240° C. | After 60 min/ 240° C. |
| 1 | 123 | 90 | 27 | 1950 | 1600 |
| 2 | 140 | 107 | 24 | 2250 | 1900 |
| 3 | 147 | 109 | 26 | 2400 | 2050 |
| A | 135 | 65 | 52 | 1700 | 1150 |

*Determined as the viscosity number

Thereafter, the procedure of Example 4 is followed, wherein the first stage is maintained for 6 hours and the second stage for 24 hours. Thereafter, the viscosity number [J] is 189 cc/g and the carboxy end group concentration [COOH] is 18 eq/$10^6$ g.

EXAMPLE B

In a 0.5 m³ tumbler dryer, 65 kg of block copolyester ([J]: 87 cc/g; [COOH]: 42 eq/$10^6$ g; [$T_m$]: 220° C.), made up of 61% by weight of terephthalic acid, 29% by weight of 1,4-butanediol, and 10% by weight of polyoxyethylenediol with $\overline{M}_n=1000$, is recondensed, without the addition of 1,4-butanediol, at 200° C., in a nitrogen stream of 2 m³/h, and at a pressure of 40 mbar. After 24 hours, the viscosity number [J] is 137 cc/g and the carboxy end group concentration [COOH] is 39 eq/$10^6$ g.

EXAMPLE 6

In a 0.5 m³ tumbler dryer, 70 kg of block copolyester ([J]: 85 cc/g; [COOH]: 28 eq/$10^6$ g; [$T_m$]: 212° C.), made up of 54% by weight of terephthalic acid, 28% by weight of 1,4-butanediol, and 18% by weight of polyoxytetramethylenediol with $\overline{M}_n=1000$, is combined with 0.35 kg of 1,4-butanediol. The procedure is then followed as described in Example 4, wherein the first stage is maintained for 6 hours at 175° C. and the second stage for 16 hours at 200° C. Thereafter, the viscosity number [J] is 168 cc/g and the carboxy end group concentration [COOH] is 16 eq/$10^6$ g.

EXAMPLE 7

In a 0.5 m³ tumbler dryer, 70 kg of block copolyester ([J]: 97 cc/g; [COOH]: 35 eq/$10^6$ g; [$T_m$]: 209° C.), made up of 46% by weight of terephthalic acid, 22% by weight of 1,4-butanediol, and 32% by weight of polyoxytetramethylenediol with $\overline{M}_n=1000$, is heated with 0.7 kg of 1,4-butanediol in a nitrogen stream (0.5 m³/h) to 175° C. and left for 6 hours at this temperature. Then, the internal temperature is raised to 195° C., the nitrogen stream is increased to 2 m³/h, and the pressure is set at 40 mbar. After 16 hours, the viscosity number [J] is 174 cc/g. The carboxy end group concentration [COOH] is 20 eq/$10^6$ g.

EXAMPLES 8-10

In an extruder, polyalkylene terephthalate (for composition and initial properties, see Table 3) as well as fillers (for type and amount, see Table 3) are intimately mixed at 250° C. and extruded into a rod which is cooled in a water bath and then granulated.

In a 0.5 m³ tumbler dryer, 100 kg of granulated material is combined with 1,4-butanediol to conduct the first stage and is left in an N₂ stream at 180° C. for some time. The N₂ stream and the temperature are further increased for the second stage.

All other process conditions can be seen from Table 4.

EXAMPLES C-E

Respectively, 100 kg of granulated material of the mixtures obtained according to Examples 8-10 (see Table 3) are recondensed in the solid phase in the usual way. (The process conditions are listed in Table 4, second stage.)

The final properties of the samples treated in accordance with the invention as well as of the comparative examples are set forth in Table 5.

TABLE 3

| | |
|---|---|
| Example 8 | 70 parts by weight of polybutylene terephthalate ([J]: 77 cc/g; [COOH]: 73 eq/$10^6$ g; [$T_m$]: 225° C.) 30 parts by weight cut glass fibers |
| Example 9 | 80 parts by weight of polybutylene terephthalate ([J]: 91 cc/g; [COOH]: 54 eq/$10^6$ g; [$T_m$]: 225° C.) 20 parts by weight of ground glass fibers |
| Example 10 | 90 parts by weight of a copolyester of terephthalic acid/dodecanedioic acid//1,4-butanediol = 90/10//100 mol-% ([J]: 100 cc/g; [COOH]: 46 eq/$10^6$ g; [$T_m$]: 213° C.) |

TABLE 3-continued

| | |
|---|---|
| | 10 parts by weight of TiO₂ ("Bayertitan RKB 2") |
| Example C | corresponds to Example 8 |
| Example D | corresponds to Example 9 |
| Example E | corresponds to Example 10 |

TABLE 4

| | First Stage | | | Second Stage Treatment | | |
|---|---|---|---|---|---|---|
| Example | Addition of 1,4-Butanediol [% by Wt.] | N₂ Flow Rate [m³/h] | Treatment Period [h] | N₂ Flow Rate [m³/h] | Temperature [°C.] | Time [h] |
| 8 | 1.2 | 0.50 | 10 | 2 | 210 | 16 |
| 9 | 1.0 | 0.75 | 7 | 2 | 210 | 20 |
| 10 | 0.7 | 0.50 | 6 | 1.75* | 200 | 15 |
| C | — | — | — | 2 | 210 | 16 |
| D | — | — | — | 2 | 210 | 20 |
| E | — | — | — | 1.75* | 200 | 15 |

*40 mbar N₂ Pressure

TABLE 5

Properties of the Specimens Treated According to Invention

| Example | [COOH] [eq/$10^6$ g] | J [cc/g] | Hydrolysis Stability* J [cc/g] | Degradation [%] | Melt Viscosity [Pa · s] After 10 min/240° C. | After 60 min/240° C. |
|---|---|---|---|---|---|---|
| 8 | 18 | 168 | 136 | 19 | 3200 | 2750 |
| 9 | 14 | 161 | 129 | 20 | 2850 | 2400 |
| 10 | 7 | 183 | 140 | 23 | 3650 | 3150 |
| C | 78 | 95 | 50 | 47 | 950 | 600 |
| D | 57 | 112 | 62 | 45 | 1300 | 850 |
| E | 54 | 123 | 64 | 48 | 1550 | 900 |

*Determined as the Viscosity Number

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for recondensing a linear polyalkylene terephthalate in two stages, at an elevated temperature, in the solid phase, and in the presence of an alkanediol, and the polyalkylene terephthalate having a viscosity number of at least 60 cc/g as measured in a solution of 0.23 g of polyalkylene terephthalate in 100 ml of phenol/1,1,2,2-tetrachloroethane (weight ratio 60:40) at 25° C., comprising, in a first stage, treating the polyalkylene terephthalate in an inert gas stream at a reaction temperature 30°-80° C. below its melting point, with 0.2-3.5% by weight, based on the weight of the polyalkylene terephthalate, of an alkanediol whose boiling point under normal pressure is 20-70° C. above the reaction temperature, wherein the amount of inert gas passed through per hour, measured under standard conditions, corresponds to 0.3 to 2 times the gross reactor volume, and wherein the first stage is conducted until the polyalkylene terephthalate has achieved essentially its minimum carboxy end group concentration; and, in a second stage, condensing the polyalkylene terephthalate in an inert gas stream at a temperature 5°–25° C. below its melting point, wherein the amount of inert gas passed through per hour, measured under standard conditions, corresponds to 2.5 to 10 times the gross reactor volume.

2. A process of claim 1 wherein the first and second stages are carried out in the same reactor and the second stage is effected by continuing the first stage with said increased inert gas flow and said increased temperature.

3. A process of claim 2, wherein the polyalkylene terephthalate is treated in the fist stage at a temperature 35°–60° C. below its melting point.

4. A process of claim 2, wherein the polyalkylene terephthalate is treated in the first stage with 0.3–1% by weight, based on the weight of the polyalkylene terephthalate, of the alkanediol.

5. A process of claim 2, wherein the polyalkylene terephthalate is treated in the first stage with an alkanediol whose boiling point under normal pressure is 30°–60° C. above the reaction temperature.

6. A process of claim 2, wherein in the first stage, the amount of inert gas passed through per hour, measured under normal conditions, corresponds to 0.5 to 1.5 times the gross reactor volume.

7. A process of claim 2, wherein the polyalkylene terephthalate, in the second stage, is condensed at a temperature 10°–20° C. below its melting point.

8. A process of claim 2, wherein in the second stage, the amount of inert gas passed through per hour, measured under normal conditions, corresponds to 3 to 7 times the gross reactor volume.

9. A process of claim 2, wherein the inert gas is nitrogen.

10. A process of claim 2 wherein the alkanediol used in the first stage corresponds to the alkylene portion of the polyalkylene terephthalate.

11. A process of claim 2 wherein the viscosity number of the starting polyalkylene terephthalate is 60–100 cc/g.

* * * * *